Aug. 25, 1942.  C. C. WRIGHT  2,293,788
ELECTRIC OUTLET BOX
Filed May 8, 1939  2 Sheets-Sheet 1
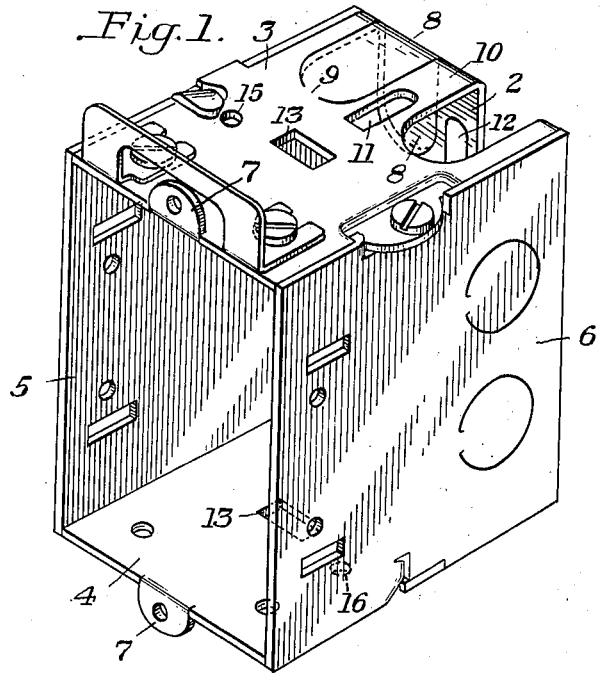
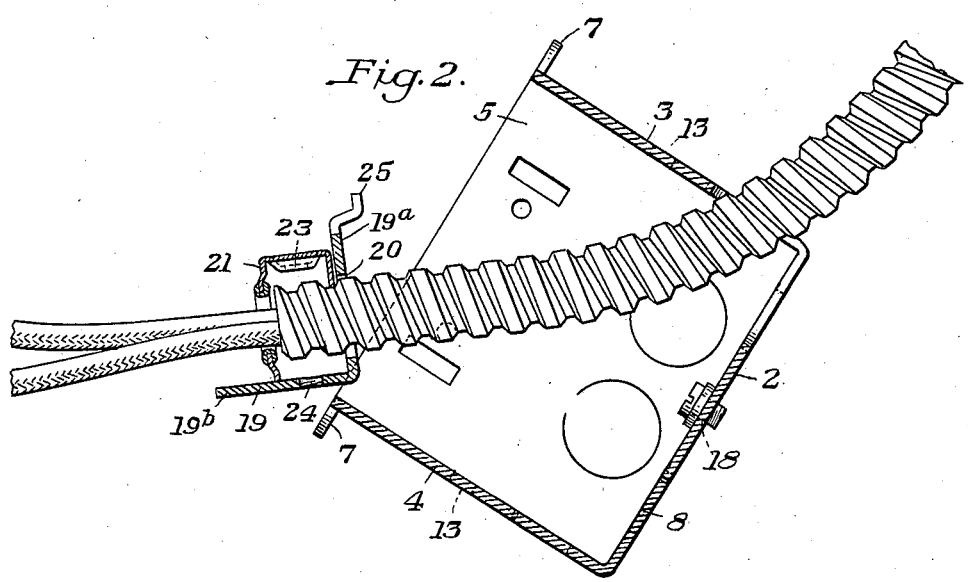
INVENTOR
Charles C. Wright
by his attorneys

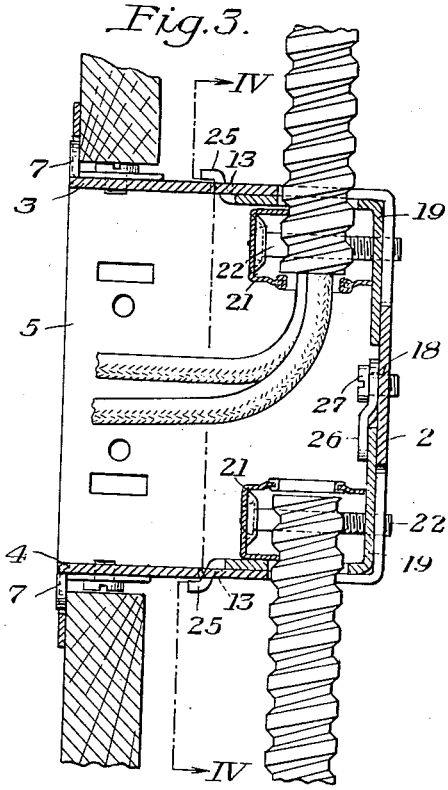
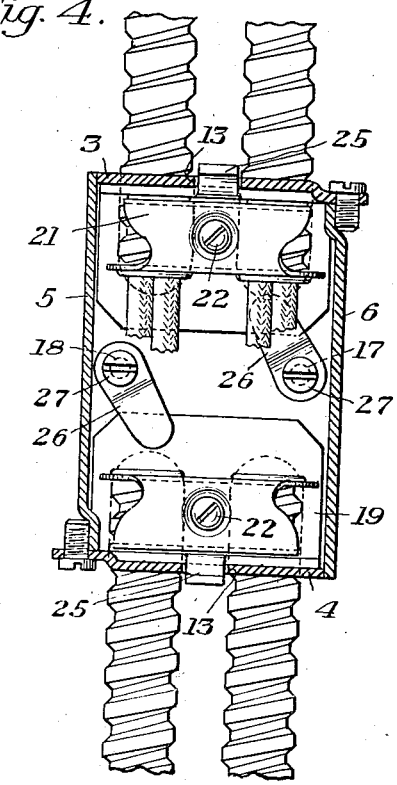
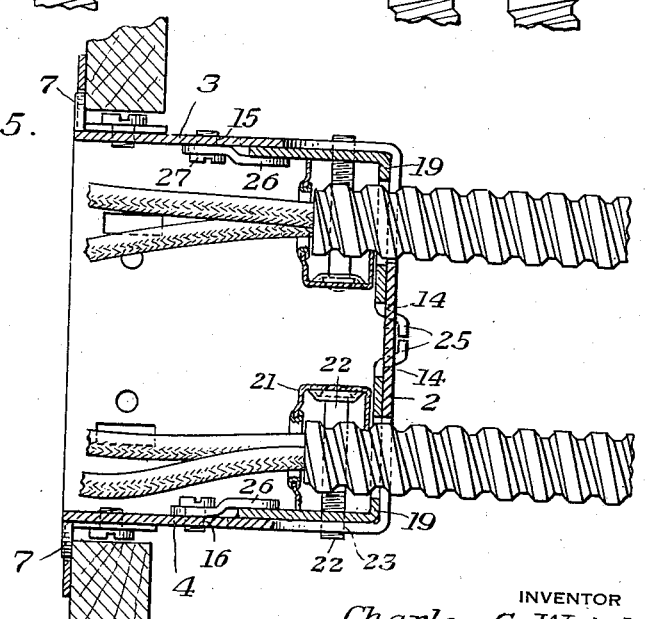

Patented Aug. 25, 1942

2,293,788

UNITED STATES PATENT OFFICE 2,293,788

ELECTRIC OUTLET BOX

Charles C. Wright, Pittsburgh, Pa., assignor to Bocjl Corporation, Pittsburgh, Pa., a corporation of Delaware Application May 8, 1939, Serial No. 272,469

2 Claims. (Cl. 285—35.2)

This invention pertains to the art of electric wiring and is for an outlet box of the character employed where an armored conduit terminates at a switch or other appliance.

Sheet metal boxes are commonly used in electric wiring installations in homes and buildings for housing either switches or outlet appliances. Armored cable, commonly referred to in the art as BX cable, has its end introduced into the box through an opening in the box. Clamping means are provided within the box to anchor the cable and prevent it from pulling out of the box. The box is arranged to receive an electric switch or an electric outlet receptacle. These boxes as commonly used are provided with means by which they can be anchored or secured in the wall or other place in which they are installed with the face of the box flush or nearly flush with the wall. As heretofore generally constructed, these boxes are provided with what are commonly termed "knock-out slugs" at various points. They are most necessary in the rear wall of the receptacle and in the top and bottom of the receptacle. They are commonly provided in the side wall of the receptacle, but rarely used. Depending upon the direction in which the cable is to enter or leave the box, appropriate knock-out slugs are removed to provide openings for the cable terminals. As heretofore commonly constructed, a removable clamp is provided inside the box. These clamps can be positioned in the box at various positions according to the direction in which the cable is entering or leaving the box. When they are screwed down tightly into place in the box, they engage the armor at the end of the cable and prevent it from pulling out.

While boxes of the type generally in use at the present time can under most circumstances be quite conveniently used in new building constructions, they are very difficult to use in re-wiring operations and in old building constructions where switch or outlet boxes are being provided at new locations. This is due to the fact that a hole must be cut in the wall of just the right size to receive the box. The BX cable must then be manipulated, usually from an inaccessible point, until the end of the cable can be pushed through the hole formed by the removal of a knock-out slug. After the cable end is finally entered through the hole in the box, it may be clamped. As an alternative procedure the hole for the box has to be made several times larger than is necessary for the box so that the cable ends can be manipulated and entered into the box, but this is not a practical procedure in most cases although it can be followed in some cases where the opening can be subsequently plastered.

According to the present invention there is provided a box of the character heretofore generally used in the art designed to facilitate its installation either in new or old constructions and capable of saving considerable time, labor, and annoyance especially in old building construction. In accordance with the present invention knock-out slugs are formed in the top and bottom corners of the box in such manner that when one of the slugs is removed, a slot-like opening is formed in the box, this opening extending inwardly from the corner through both the back wall of the box and through a horizontal wall. Instead of the cable end being clamped directly to the box, there is provided according to the present invention an intermediate member adapted to fit into the corner box and be secured in the corner, this intermediate member being separate from the box and carrying a clamping means by means of which it can be attached to the end of the cable. In use the cable ends, after they have been pulled through the hole in the wall provided for the box, can be slipped through the slots or openings in the corner of the box before the box has been put into place in the opening. The box can then be slipped back into the hole in the wall provided for it and the intermediate member with its clamp may then be attached to the projecting cable ends. After the intermediate member has been thus attached, the cable or cables can be pulled back from the end remote from the switch or outlet box. When the intermediate member pulls up into the corner of the box it is secured in place. It serves to cover the slot formed by the removal of the knock-out piece and when it is secured in place in the box it anchors the cable to the box. The installation of the box is then complete.

The invention may be readily understood by reference to the accompanying drawings in which Figure 1 represents a perspective view of a box embodying my invention;

Figure 2 is a vertical section through the box shown in Figure 1 showing the manner of entering the cable through the box before the box is applied to the hole in the wall and the manner in which the clamping piece is applied to the terminal of the cable or cables at a readily accessible point outside the box;

Figure 3 is a vertical section through an installation showing the box mounted in the wall and showing cables entering the box from both the top and bottom;

Figure 4 is a transverse section at right angles to Figure 3, the view being substantially in the plane of line IV—IV of Figure 3;

Figure 5 is a view similar to Figure 3 showing an installation where both cables or both sets of cables enter the box from the rear instead of in a vertical direction.

Referring to the drawings, the box is generally of a construction similar to that heretofore employed having a rear wall 2 formed integrally with top and bottom walls 3 and 4. The structure comprising the top and end walls 2, 3, and 4 is of U form and secured to each side of this U-shaped piece are similar side plates designated 5 and 6. At the forward end of the top and bottom walls 3 and 4 are the customary ears 7.

In the corner edges of the box between the end and rear wall are angular knock-out slugs 8, these slugs having a slender point of attachment to the box as at 9 so that they can be readily removed, but unless they are removed, they form an integral part of the box enclosure. For the purpose of illustration one of these slugs is shown in place in Figures 1 and 2 and one is shown removed. When the knock-out slugs 8 are removed, they form an opening in the corner wall of the box which extends into the end wall and which extends down into the back wall. Preferably there are two of these knock-out slugs in each rear corner edge of the box. Between the knock-out slugs is a solid strip of metal 10, this strip of metal being integral with the box structure. It is provided with an elongated slot 11 in the end wall portion thereof and a similar slot 12 in the rear wall portion thereof. Each end wall is also provided with an opening 13 which is in a central line with the lug 7 and the slot 11. Similar openings are provided at 14 in the rear wall, the location of these openings being best seen in Figure 5. In the top wall 3 of the box to one side of the opening 13 is a threaded opening 15 into which a screw hereinafter described may be threaded. A similar opening is provided in the bottom wall at 16, the location of this opening being best shown in Figure 5. Similar threaded openings are also provided in the rear wall 2 at 17 and 18, the location of these openings being best shown in Figures 2, 3, and 4.

The openings provided by the removal of the knock-out slugs 8 enable the end of an armored cable to be entered into the box. For anchoring the cable ends in the box there are provided one or more intermediate corner members 19. Each member 19 is of angular form having a horizontal flange and a vertical flange. Its length is such that it extends across the full width of the interior of the box. It is provided with two openings 20 in one of the angular flanges thereof and parallel cable ends may be passed through these openings. Mounted on the inside of each of the intermediate members 19 is a clamping yoke 21 formed of a sheet of metal. It is secured to the member 19 by a single screw 22 which passes through a hole in the middle of the clamping yoke 21, this hole being located at 23 (see Figure 5). The end of the screw 22 passes through a threaded opening 24 in the member 19. The clamping yoke itself is the same as clamping yokes being used at the present time in switch boxes but as heretofore constructed this clamping yoke has been attached directly to the interior of the box instead of being attached to an intermediate member. One flange 19a of the intermediate member 19 is provided with an upwardly extending outwardly offset lug or projection 25. The projection 25 is adapted to enter one of the holes 13 or 14 in the box.

In use the appropriate knock-out slugs 8 are removed, the cable ends are then passed through the openings formed through their removal as shown in Figure 2, the box may then be slipped into place in the hole in the wall formed for its reception, and the ends of the cable or cables are attached to the intermediate member 19 as shown in Figure 2. The cables are then pulled back from the end which is remote from the box until the intermediate member is pulled up into the corner of the box. The intermediate member is then manipulated in such a way as to cause the lug 25 to project through one of the openings 13 or 14. If the cable enters the box in a vertical direction as shown in Figures 2, 3, and 4, the lug 25 passes through the opening 13 at the end of the box through which the cable enters. If the cables enter the box in a horizontal direction as shown in Figure 5, the corner members are then reversed so that the flange 19a instead of lying against the top wall or the bottom wall as shown in Figure 3 lies against the rear wall as shown in Figure 5. In this case the lug 25 projects through the appropriate opening 14.

When the corner piece has been manipulated to cause the plug 25 to enter the appropriate opening, a clamping finger 26 previously loosely secured in place by means of a screw 27 threaded into one of the openings 15, 16, 17, or 18 as the case may be is turned to overlap the other flange 19b of the intermediate member after which the screw 27 is tightened and the intermediate corner member is thus firmly and immovably clamped in position. If the cables enter the box from a vertical direction as shown in Figure 3, the clamping finger or fingers 26 are mounted on the rear wall of the box whereas if the cables enter from a horizontal direction as shown in Figure 5, they are mounted on the appropriate top or bottom wall. The slots 11 and 12 provide a clearance for the end of the screw 22 which projects through the flange 19b of the intermediate member 19. When the cable enters the box from a vertical direction, the end of the screw projects into the slot 12 whereas when the cable enters from a horizontal direction, the end of the screw is received in the slot 11. By having the corner members or intermediate members reversible and by having all of the various holes and slots located as described, one standard form of box and one standard form of intermediate member 19 is applicable for every condition of wiring which is normally encountered.

By providing a clamping yoke for the cable ends on separate intermediate members which are subsequently firmly attached to the interior of the box, the installation of the boxes is very greatly facilitated over the present practice of having the clamping means mounted directly in the box. This can be most readily appreciated by reference to Figure 2 wherein it will be seen that the securing of the cable ends to the clamping member can be performed outside of the box. The use of elongated knock-out slugs 8 which form an angle-shaped opening extending along the back wall and into the end wall is of importance both in providing sufficient clearance to enable the intermediate member and the box to be properly manipulated and also for the purpose of enabling the cables to enter the box from either a vertical or a horizontal direction.

While the present invention very materially facilitates the installation of switch and outlet boxes, particularly in old building construction, it does not add appreciably to the cost of manufacturing the boxes nor does it detrimentally effect the boxes in any way. The convenience of the invention will be readily appreciated by those skilled in the art who are familiar with the difficulties encountered in installing boxes at the present time.

While I have illustrated and described a particular embodiment of my invention, it will be understood that various changes and modifications may be made in the construction shown within the contemplation of my invention and within the scope of the following claims.

I claim:

1. A wiring fixture of the class described comprising a box-like structure having walls on all faces except one, one face being open, said box having angular knock-out slugs in the inner corner edges thereof so positioned that the removal of a slug will form an opening in that wall of the box which is opposite the open face and also in a wall of the box which is perpendicular to said first wall, an intermediate member fitting into the corner of the box where said two walls join, separate cable anchoring means on the intermediate member, screw means for securing the anchoring means to the intermediate member and means for releasably holding said intermediate member in the corner into which it is fitted.

2. A wiring accessory of the class described comprising a box-like structure having an open face and having rear, side, and end walls, said box having a cable opening in a corner portion thereof where the rear and end walls join, the opening being formed in both walls, an angle-shaped intermediate member which fits into the corner where the end and rear walls join, cable anchoring means on the intermediate member, and means for retaining the intermediate member in place, said means comprising an extension on one leg of the angle-shaped intermediate member having an offset lug thereon which passes through an opening formed in the box to receive it and which holds one leg of the intermediate member against the face of one wall of the box, and a movable clamping element on another wall of the box to engage the other leg of the angle-shaped intermediate member.

CHARLES C. WRIGHT.